United States Patent [19]

Hoogstoel

[11] 4,342,903
[45] Aug. 3, 1982

[54] SNAIL REHEATER

[76] Inventor: Robert Hoogstoel, 2 bis, rue Mercoeur, Paris, France, 75011

[21] Appl. No.: 135,678

[22] Filed: Mar. 31, 1980

[30] Foreign Application Priority Data

Mar. 29, 1979 [FR] France ................................. 79 07872

[51] Int. Cl.³ ............................................. H05B 1/00
[52] U.S. Cl. .................................... 219/386; 219/201; 219/433; 219/218; 219/521
[58] Field of Search ............... 219/386, 387, 385, 432, 219/434, 435, 436, 438, 421, 433, 449, 521, 465, 472, 218, 433, 201; 99/440, 426, 428, 427, 430, 439, 440, 441, 442, 444, 446, 448; 249/55, 78, 80, 81, 120

[56] References Cited

U.S. PATENT DOCUMENTS

| | | | |
|---|---|---|---|
| 1,005,166 | 10/1911 | Crombie | 219/436 |
| 1,837,535 | 12/1931 | Duffey et al. | 99/426 |
| 2,078,650 | 4/1937 | Clark | 219/387 |
| 3,636,299 | 1/1972 | Stewart, Jr. | 219/218 |
| 3,831,508 | 8/1974 | Wallard | 99/446 |
| 4,068,115 | 1/1978 | Mack et al. | 219/386 |

FOREIGN PATENT DOCUMENTS

| | | | |
|---|---|---|---|
| 11630 | of 1912 | United Kingdom | 219/433 |
| 639835 | 7/1950 | United Kingdom | 219/387 |

Primary Examiner—Bernard Roskoski
Attorney, Agent, or Firm—Sandler & Greenblum

[57] ABSTRACT

Novel assembly for reheating snails. The assembly comprises at least one snail tray having a plurality of depressions. The depressions are adapted to receive a single snail. The assembly further comprises a heating apparatus comprising a series of depressions corresponding to those of the snail tray on the top surface of the heating apparatus.

6 Claims, 3 Drawing Figures

U.S. Patent  Aug. 3, 1982  4,342,903
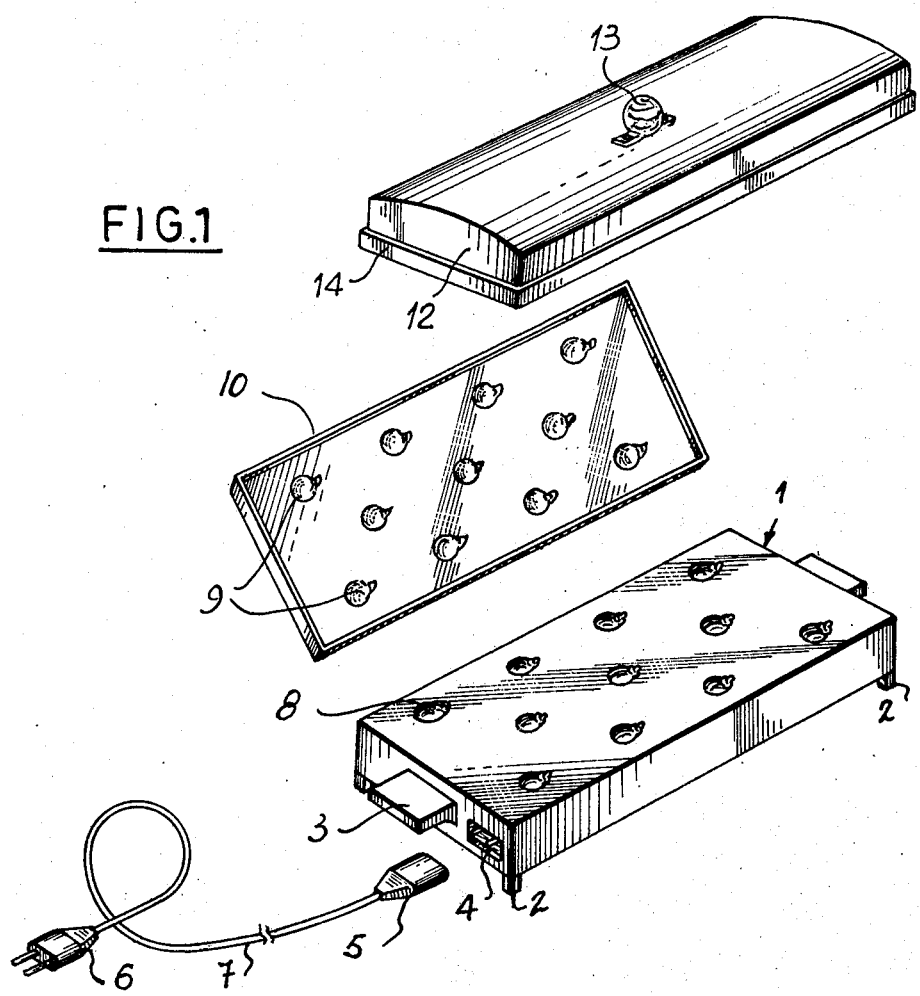
FIG.1
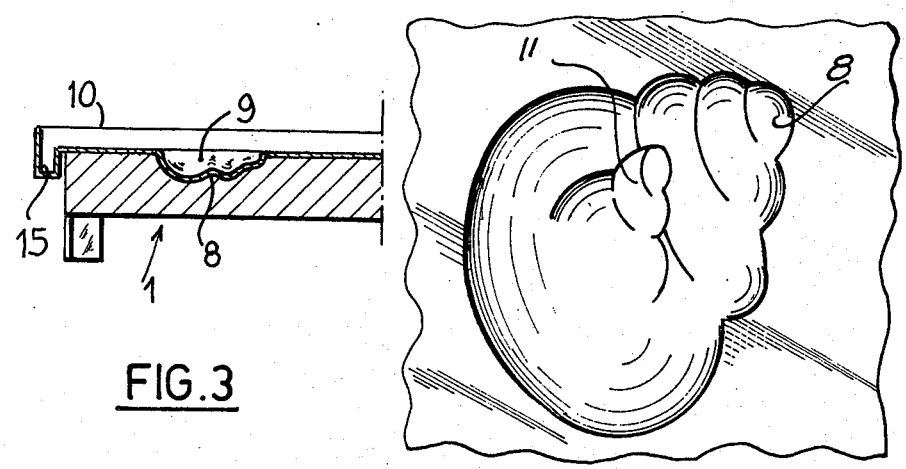
FIG.2
FIG.3

SNAIL REHEATER

BACKGROUND OF THE INVENTION

1. Field of the Invention

The present invention relates to a snail reheater.

2. Description of Prior Art

Snails are generally bought in a pre-cooked state and it is necessary only to place them in an oven to be warmed or "reheated" so that they be ready to be served for eating. Since snail shells normally have a tendency to roll, snail trays are used which are provided with depressions which enable the shells to be held in position, with their openings facing upwardly. Quite obviously, the snails must only be heated without being cooked, since during cooking the bodies become wrinkled and loose all of their flavor.

It often occurs that snails which have been reheated in an oven prior to serving are left in the oven for too long and, as a result, loose some of their flavor and are less tasty.

SUMMARY OF THE INVENTION

It is an object of the present invention to develop an assembly or unit for the warming of "reheating" of snails which avoids the insertion of the snails in an oven so that the person in charge, housewife or cook is better able to supervise the heating process.

It is a further object of the invention to provide an assembly or unit which is adapted to be placed directly on the dining room table such that the housewife or chef need not leave the table in the course of the meal.

According to the invention, a novel assembly for the reheating of snails is provided. The assembly comprises a snail tray formed with depressions which are each adapted to receive a single snail and a heating apparatus, such as an electric hot-plate. The top surface of the heating apparatus or hot-plate is formed with a series of depressions corresponding to that of the snail tray. By virtue of this construction, the snail tray is adapted to fit exactly on the top surface of the heater, each of the depressions of the snail tray cooperating with a corresponding depression of the hot-plate so that the snails are perfectly reheated.

In a preferred embodiment of the invention, each depression in the snail tray and each depression in the hot-plate is shaped to conform to the shape of a snail shell, combined with at least one similar secondary depression, which is smaller and oriented in a different direction.

A cover or rim may be provided for covering the snail tray and thereby assuring better reheating.

According to yet another aspect of the invention, the snail tray comprises a gutter or trough along its periphery which extends beyond the edge of the heating apparatus. As a result, when the tray is removed from the heating apparatus, spilling of the sauce which forms during reheating is avoided.

BRIEF DESCRIPTION OF DRAWINGS

The invention will now be described with reference to one embodiment thereof, by way of example, in the annexed drawings, wherein:

FIG. 1 is a perspective view of an assembly according to the invention;

FIG. 2 is a magnified view of a portion of the top surface of the hot-plate; and FIG. 3 is a cross-sectional view, on a magnified scale, showing a portion of the hot-plate and of the tray positioned thereon.

DESCRIPTION OF THE PREFERRED EMBODIMENTS

As may be seen from FIG. 1, an electric hot-plate 1 is illustrated which includes a heating plate supported by feet 2 and provided with a plug 4 permitting the connection of the electric resistances contained in the hot-plate to a suitable supply of electric current by means of a flexible cable. The cable comprises, at one end, a plug adapted to be fitted into a common supply socket and, at the other end, a socket 5 adapted to be fitted onto the plug 4 in the hot-plate. The hot-plate 1 is provided with a thermostat for controlling temperature.

The top surface of the hot-plate is formed to include depressions 8, whose arrangement and spacing corresponds exactly to the depressions in snail tray 10 adapted to be positioned on the hot-plate 1.

In a preferred embodiment of the invention, and as will be seen from FIG. 2, each depression is formed to have the general shape of the standard, large-size snail shell as well as a secondary depression 11, formed within the standard size depression. The secondary depression corresponds to the general shape of the shell of a snail having a smaller standard size.

The depressions 9 in the snail tray 10 are of the same type and shape as the depressions 8 on the top surface of the hot-plate and, consequently, are adapted to fit perfectly in the depressions 8. The snails are placed on the tray 10 in the depressions 9 and the tray is positioned on the top surface of the hot-plate 1 so that the snails are heated. The tray 10 is preferably made out of a metal which is a good heat conductor and, since it is independent from and can be removed from the hot-plate, it can be easily cleaned after use. By virtue of the tray, it is possible to avoid the necessity of washing the top surface of the hot-plate since this would involve the danger of water being introduced into the electrical system with resulting damage to the system.

A cover 12 having an insulated handle 13 and also a rim 4 is adapted to cooperate with the edge of the snail tray 10. The cover ensures a better distribution of the heat for the reheating of the snails.

As may be seen from FIG. 3, the tray 10 is formed at its periphery with a gutter 15 which is adapted to hold the sauce when the tray is removed from the hot-plate, thereby avoiding the danger of the sauce being spilled. It will be noted that the gutter 15 is situated externally of the hot-plate such that it does not interfere with the coincidence of the depressions 8 and 9.

It should be apparent that the assembly is particulary practical and that it allows for the simple warming or "reheating" of snails prior to serving.

It should be obvious that the invention is not limited to the embodiments specifically disclosed and described in the annexed drawings. Thus, it is possible to incorporate numerous modifications with respect to various details without departing from the scope of the invention. For example, the tray 10 may be formed out of several distinct elements, each comprising, for example, six depressions, such that each distinct element may be used as a tray which may be served to different people.

What is claimed is:

1. Novel assembly for reheating snails, said assembly comprising at least one snail tray having a plurality of depressions, said depressions being configured and adapted to receive a single snail wherein each of said depressions in said at least one snail tray is formed to have the shape of a snail shell, and a heating apparatus, said heating apparatus comprising a series of heating apparatus depressions corresponding in shape and position to said depressions of said at least one snail tray on the top surface of said heating apparatus, each of said depressions in the top surface of said heating apparatus being formed to have the shape of a snail shell, and wherein said at least one snail tray is mounted on said heating apparatus whereby said depressions of said at least one snail tray fit within corresponding heating apparatus depressions.

2. The novel assembly as defined by claim 1 wherein said heating apparatus is a hot-plate.

3. The novel assembly as defined by claim 1 wherein each of said depressions in said at least one snail tray further comprises at least one secondary depression, said secondary depression being smaller and oriented differently from said depression in said at least one snail tray within which said secondary depression is located.

4. The novel assembly as defined by claim 1 further comprising a cover designed for covering said snail tray.

5. The novel assembly as defined by any one of claims 1, 2, 3, or 4, wherein said at least one snail tray comprises, along its periphery, a gutter adapted to extend beyond the edge of said heating apparatus, said gutter being adapted to collect sauce during reheating.

6. The novel assembly as defined by claim 1 comprising a plurality of said snail trays adapted to be served to different individuals.

* * * * *

UNITED STATES PATENT AND TRADEMARK OFFICE
CERTIFICATE OF CORRECTION

PATENT NO. : 4,342,903

DATED : August 3, 1982

INVENTOR(S) : Robert HOOGSTOEL

It is certified that error appears in the above-identified patent and that said Letters Patent is hereby corrected as shown below:

Column 1, line 25, "of" should be --or--.

Column 2, line 43, "4" should be --14--.

Column 2, line 53, "particulary" should be --particularly--.

Signed and Sealed this

Nineteenth Day of October 1982

[SEAL]

Attest:

GERALD J. MOSSINGHOFF

Attesting Officer    Commissioner of Patents and Trademarks